(12) United States Patent
Asaoka et al.

(10) Patent No.: US 10,131,270 B2
(45) Date of Patent: Nov. 20, 2018

(54) VEHICLE HEADLAMP DEVICE

(71) Applicant: TOYOTA JIDOSHA KABUSHIKI KAISHA, Toyota-shi, Aichi-ken (JP)

(72) Inventors: Kazuya Asaoka, Seto (JP); Nobuyuki Shiraki, Nagakute (JP); Shigeyoshi Hiratsuka, Nagakute (JP); Shin-ichi Kojima, Nagakute (JP); Toshihiko Tsukada, Nagakute (JP); Keiichi Shimaoka, Nagakute (JP); Kazunori Higuchi, Nagakute (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 4 days.

(21) Appl. No.: 15/318,496

(22) PCT Filed: Jun. 9, 2015

(86) PCT No.: PCT/IB2015/000880
§ 371 (c)(1),
(2) Date: Dec. 13, 2016

(87) PCT Pub. No.: WO2015/193714
PCT Pub. Date: Dec. 23, 2015

(65) Prior Publication Data
US 2017/0129389 A1 May 11, 2017

(30) Foreign Application Priority Data
Jun. 17, 2014 (JP) .................................. 2014-124312

(51) Int. Cl.
*B60Q 1/08* (2006.01)
*G01M 11/06* (2006.01)
(Continued)

(52) U.S. Cl.
CPC ............... *B60Q 1/085* (2013.01); *B60Q 1/08* (2013.01); *F21S 41/675* (2018.01);
(Continued)

(58) Field of Classification Search
CPC . B60Q 1/085; B60Q 2300/05; F21S 48/1757; G01M 11/064; G01M 11/06;
(Continued)

(56) References Cited

U.S. PATENT DOCUMENTS 6,144,159 A     11/2000  Lopez et al.
9,809,159 B1 *  11/2017  Snyder .................. B60Q 1/525
(Continued)

FOREIGN PATENT DOCUMENTS

DE    102012102446 A1   9/2013
DE    102012023126 A1   5/2014
(Continued)

*Primary Examiner* — Anabel Ton
(74) *Attorney, Agent, or Firm* — Sughrue Mion, PLLC

(57) ABSTRACT

A vehicle headlamp device includes headlamps, which are structured so as to be able to project or irradiate given patterns and given shapes without distortion on a given virtual surface in front of a vehicle from a left headlight and a right headlight, respectively, a camera that captures an image of the area in front of the vehicle, and a state detecting portion configured to detect distortion of the given patterns, which are projected or irradiated on an irradiated surface in front of the vehicle, relative to the given patterns projected or irradiated on the given virtual surface in front of the vehicle, based on the captured image, and also detect a state of the irradiated surface based on the distortion, and a correcting portion configured to correct a relative optical axis deviation between the left headlight and the right headlight.

13 Claims, 3 Drawing Sheets

(51) Int. Cl.
*F21S 41/675* (2018.01)
*G06K 9/00* (2006.01)
*H04N 7/18* (2006.01)

(52) U.S. Cl.
CPC ........ *G01M 11/064* (2013.01); *G01M 11/068* (2013.01); *G06K 9/00791* (2013.01); *H04N 7/183* (2013.01); *B60Q 2200/38* (2013.01); *B60Q 2300/05* (2013.01); *B60Q 2400/40* (2013.01); *B60Q 2400/50* (2013.01)

(58) Field of Classification Search
CPC ............. G01M 11/065; G01M 11/068; G06K 9/00791; H04N 7/183

USPC .......................... 362/465, 466, 467, 468, 469

See application file for complete search history.

(56) References Cited

U.S. PATENT DOCUMENTS

| | | | |
|---|---|---|---|
| 2005/0036660 | A1* | 2/2005 | Otsuka ................. B60Q 1/1423 382/104 |
| 2008/0103661 | A1* | 5/2008 | Sugimoto ............. B60Q 1/122 701/49 |
| 2013/0279185 | A1 | 10/2013 | Totzauer |
| 2015/0163470 | A1 | 6/2015 | Katsumi |
| 2015/0307018 | A1* | 10/2015 | Shibata ................. B60Q 1/143 362/466 |
| 2016/0250964 | A1* | 9/2016 | Takagaki ................ B60Q 1/08 362/466 |

FOREIGN PATENT DOCUMENTS

| | | |
|---|---|---|
| EP | 1375249 A1 | 1/2004 |
| JP | 05-087686 A | 4/1993 |
| JP | 2012-162105 A | 8/2012 |
| JP | 2012-228976 A | 11/2012 |
| WO | 2013/172445 A1 | 11/2013 |

\* cited by examiner

FIG. 3A
FIG. 3B
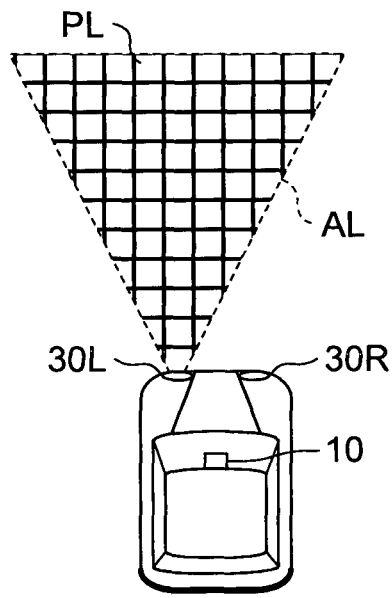
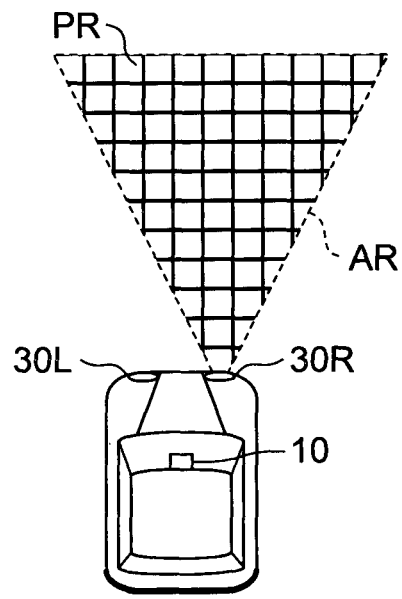
FIG. 4A
FIG. 4B
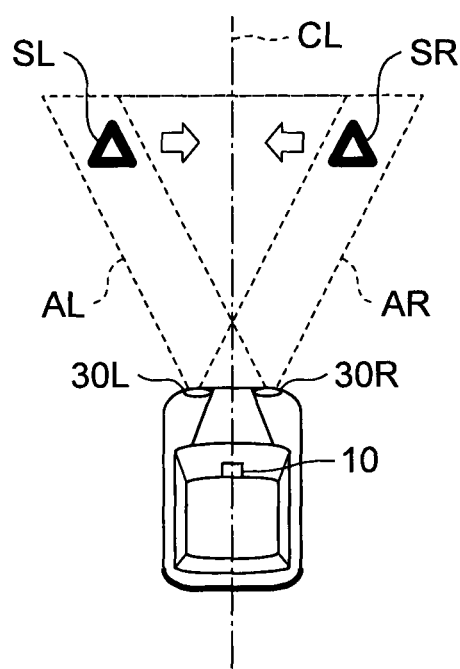
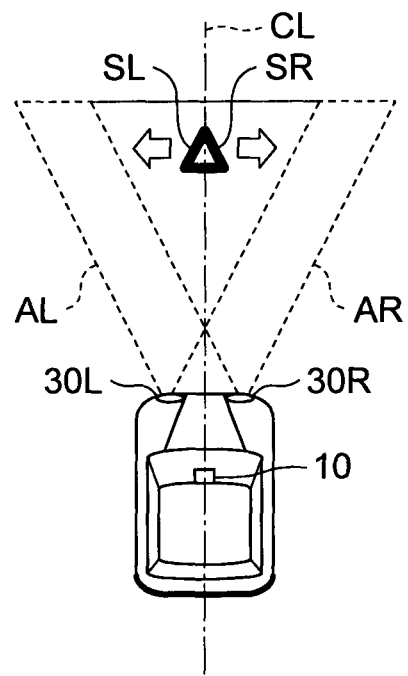

VEHICLE HEADLAMP DEVICE

BACKGROUND OF THE INVENTION

1. Field of the Invention

The invention relates to a vehicle headlamp device.

2. Description of Related Art

A method for adjusting an optical axis of a headlight using a headlight tester is known (for example, Japanese Patent Application Publication No. 5-087686 (JP 5-087686 A)).

However, optical axis adjustment using a headlight tester requires dedicated adjusting equipment, and, in reality, a headlamp is used without adjusting an optical axis deviation that occurs in the headlamp. Therefore, inconvenience may arise in a vehicle headlamp device that requires high accuracy in irradiation position.

For example, in a vehicle headlamp device, which is structured so as to be able to change a light distribution pattern as appropriate with the aim to, for example, improve visibility of an area in front of a vehicle, and perform glare protection for a pedestrian, an oncoming vehicle, and so on, it is not possible to irradiate an area in front of the vehicle in an appropriate light distribution pattern when an optical axis is deviated. Thus, the aims may not be achieved.

SUMMARY OF THE INVENTION

Therefore, the invention provides a vehicle headlamp device that is able to correct an optical axis deviation by itself without using dedicated equipment.

In one embodiment, a vehicle headlamp device is headlamps irradiating an area in front of a vehicle, which includes the headlamps which include a left headlight and a right headlight mounted on a left side and a right side of the vehicle, respectively, and are structured so as to be able to project or irradiate given patterns and given shapes without distortion on a given virtual surface in front of the vehicle from the left headlight and the right headlight, respectively, a camera that captures an image of the area in front of the vehicle, and a state detecting portion configured to detect distortion of the given patterns, which are projected or irradiated on an irradiated surface in front of the vehicle from the left headlight and the right headlight, respectively, relative to the given patterns projected or irradiated on the given virtual surface in front of the vehicle, based on the image captured by the camera, and also detect a state of the irradiated surface including unevenness of the irradiated surface and an angle of the irradiated surface to the given virtual surface based on the distortion, and a correcting portion configured to correct a relative optical axis deviation between the left headlight and the right headlight. The headlamps project or irradiate the given shapes without distortion on the irradiated surface from the left headlight and the right headlight, respectively, based on the state detected by the state detecting portion, and the correcting portion detects a deviation amount of each of the given shapes that is projected or irradiated without distortion on the irradiated surface from each of the left headlight and the right headlight, based on the image captured by the camera, and the correcting portion corrects the optical axis deviation based on the deviation amounts of the given shapes.

The vehicle headlamp device is also headlamps that irradiate an area in front of a vehicle, which includes headlamps structured so as to be able to project or irradiate a given pattern and a given shape without distortion on a given virtual surface in front of the vehicle, a camera that captures an image of the area in front of the vehicle, a state detecting portion configured to detect distortion of the given patterns, which are projected or irradiated by the headlamps on an irradiated surface in front of the vehicle, relative to the given patterns projected or irradiated on the given virtual surface in front of the vehicle, based on the image captured by the camera, and also detect a state of the irradiated surface including unevenness of the irradiated surface and an angle of the irradiated surface to the given virtual surface based on the distortion, and a correcting portion configured to correct optical axis deviations of the headlamps relative to an image-capturing direction of the camera. The headlamps project or irradiate the given shapes without distortion on the irradiated surface based on the state detected by the state detecting portion, and the correcting portion detects positions and sizes of the given shapes that are projected or irradiated without distortion on the irradiated surface from the headlamps, based on the image captured by the camera, and the correcting portion corrects the optical axis deviation based on difference between the position and position of the given shape, which is projected or irradiated on the irradiated surface when there is no optical axis deviation, calculated based on the state, and based on difference between the size and size of the given shape, which is projected or irradiated on the irradiated surface when there is no optical axis deviation, calculated based on the state.

According to the above embodiment, it is possible to provide a vehicle headlamp device that is able to correct an optical axis deviation by itself without using dedicated equipment.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3A is a view explaining an example of a method for detecting a state of an irradiated surface (a road surface) by the vehicle headlamp device according to the embodiment, and FIG. 3B is a view explaining an example of the method for detecting a state of an irradiated surface (a road surface) by the vehicle headlamp device according to the embodiment; and FIG. 4A is a view explaining an example of a method for detecting an optical axis deviation by the vehicle headlamp device according to the embodiment, and FIG. 4B is a view explaining an example of the method for detecting an optical axis deviation by the vehicle headlamp device according to the embodiment.

DETAILED DESCRIPTION OF EMBODIMENTS

An embodiment of the invention is explained below with reference to the drawings.

Figure 1:
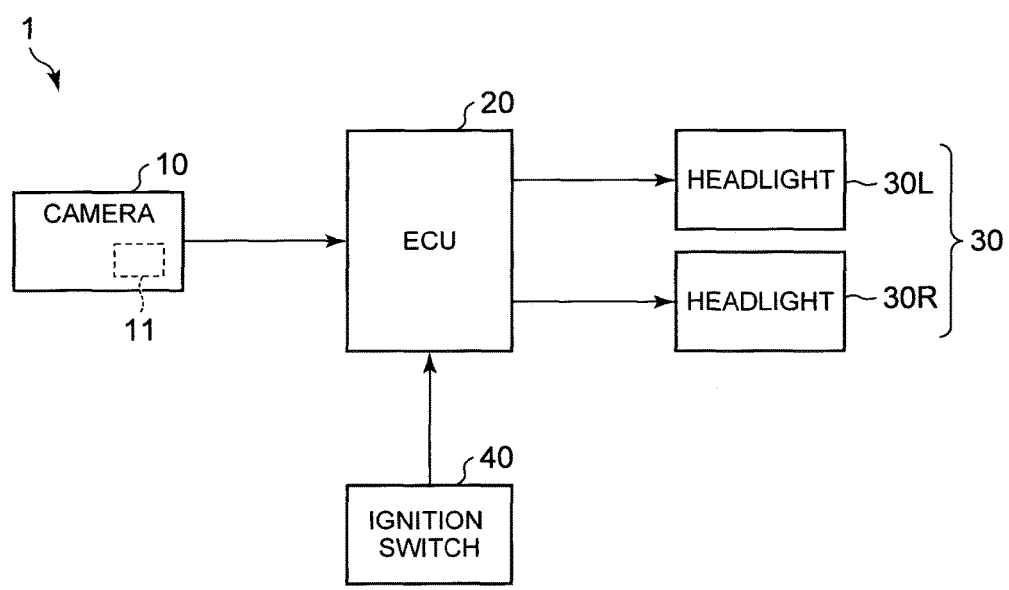
FIG. 1 is a structural view showing an example of a structure of a vehicle headlamp device according to an embodiment.

FIG. 1 is a structural view showing an example of a vehicle headlamp device 1 according to the embodiment.

The vehicle headlamp device 1 is mounted on a vehicle and includes a camera 10, an ECU 20, headlamps 30, an ignition switch 40, and so on.

Herein below, descriptions regarding directions (a longitudinal direction, a horizontal direction, and a vertical direction) are used as a longitudinal direction, a horizontal direction, and a vertical direction of a vehicle, respectively, unless otherwise specified.

The camera 10 is image-capturing means for capturing an image of an area in front of a vehicle, and includes an image-processing part 11. The camera 10 may be mounted at any position where the camera 10 is able to image an area in front of the vehicle. For example, the camera 10 may be arranged in a cabin in an upper part of a windshield in terms of protection against dust and water. The camera 10 outputs a captured image to the image-processing part 11. Unless the operation of the camera 10 is stopped, the camera 10 may continuously capture, for example, 30 frames of images of an area in front of a vehicle per second, or capture images of an area in front of a vehicle only in a given case that is explained later.

The image-processing part 11 carries out processing of detecting an object in front of a vehicle based on images of an area in front of the vehicle captured by the camera 10 (herein below, also simply referred to as captured images). To be specific, as described later, the image-processing part 11 detects a given pattern such as a lattice pattern and a checkerboard pattern, or a given shape such as a diagram, a letter, and a mark, which is projected on an irradiated surface (a road surface, a wall, and so on) in front of the vehicle from the headlamps 30 (from each of a left headlight 30L and a right headlight 30R explained later). For example, the image-processing part 11 may perform pattern-matching image processing for preregistered given pattern and given shape, and detect the given pattern and the given shape from the resultant similarity (difference level).

Further, the image-processing part 11 detects a state of an irradiated surface, including unevenness of the irradiated surface, an angle (inclination) of the irradiated surface with respect to a given virtual surface, and so on, based on a detected distortion level of the detected given pattern. To explain more specifically, the given pattern is projected without distortion on a given virtual surface in front of the vehicle (for example, a plane same as a road surface (plane) where the vehicle is located) from each of the left headlight 30L and the right headlight 30R, as described later. When the irradiated surface in front of the vehicle is uneven, the given pattern that is actually projected is distorted in accordance with a degree of the unevenness. Also, when the irradiated surface in front of the vehicle is a plane inclined (having an angle) with respect to the given virtual surface, distortion (irregularity) happens in the given pattern, such as a lattice pattern and a checkerboard pattern, in which straight lines, diagrams, and so on are arrayed regularly. Therefore, based on the distortion of the given pattern projected on the irradiated surface in front of the vehicle from the headlamp 30 (each of the headlights 30L, 30R), with respect to the given pattern projected on the given virtual surface, it is possible to detect a state of the irradiated surface, including unevenness of the irradiated surface, an angle (inclination) of the irradiated surface with respect to the given virtual surface, and so on. For example, the image-processing part 11 may detect distortion of the given pattern included in a captured image, with respect to the given pattern projected on a preregistered given virtual surface, and calculate (detect) unevenness, an angle (inclination) to the virtual surface, and so on of the irradiated surface in front of the vehicle, based on the distortion (a degree and a level of the distortion). To be more specific, a correlation between level and degree of distortion of a given shape, and amounts of unevenness and inclination of an irradiated surface with respect to a given virtual surface may be stored as a map in an internal memory and so on, and unevenness, an angle (inclination) with respect to a given virtual surface, and so on of an irradiated surface in front of a vehicle may be detected (calculated). The mage-processing part 11 is connected with the ECU 20 so as to be able to communicate with the ECU 20 through an on-vehicle LAN and so on, and outputs information to the ECU 20 regarding a detected state of an irradiated surface in front of a vehicle, including unevenness, an angle (inclination) with respect to a virtual surface, and so on.

The given pattern is not limited to a lattice pattern and a checkerboard pattern, as long as it is possible to detect a state of an irradiated surface, such as unevenness, an angle (inclination) with respect to a given virtual surface, and so on, by projecting the given pattern on the irradiated surface in front of a vehicle.

Based on a detected captured image, the image-processing part 11 detects a position and a size of the given shape (for example, dimensions in the vertical direction and the horizontal direction on an irradiated surface) projected on the irradiated surface from each of the left headlight 30L and the right headlight 30R. For example, the image-processing part 11 previously stores a correspondence relation between each point on the captured image including a given virtual surface, and each point of the given virtual surface, in an internal memory and so on. Then, by referring to the above-mentioned state of the irradiated surface in front of the vehicle, the position and the size of the given shape on the irradiated surface are calculated in accordance with the state of the irradiated surface, on the basis of the given virtual surface. The image-processing part 11 outputs the detected position and size of the given shape to the ECU 20. Based on images captured continuously by the camera 10, the image-processing part 11 may detect the position and size of the projected given shape every time the given shape is detected, or may detect the position and size of the projected given shape only in a given case, as stated later.

A part of or all of functions of the image-processing part 11 may be realized by an external processor of the camera 10, for example, by the ECU 20.

The ECU 20 is control means for controlling the headlamps 30. For example, the ECU 20 may be structured by a microcomputer and so on and carry out various types of control processing by executing various programs stored in a ROM on a CPU. As described later, the headlamps 30 are lighting means, which is able to change a light quantity per irradiation (emission) direction within an irradiation range. Therefore, the ECU 20 is able to project the given pattern or the given shape in front of a vehicle from the headlamps 30 (both the left headlight 30L and the right headlight 30R) as stated later, by carrying out control of a light quantity per irradiation direction of each of the headlamps 30. In addition, as stated below, the ECU 20 is able to move the given shapes projected in front of a vehicle from the left headlight 30L and the right headlight 30R, respectively.

The ECU 20 projects the given patterns on the given virtual surface in front of a vehicle from the headlamps 30 (the respective left headlight 30L and the right headlight 30R) without distortion. To be more specific, the ECU 20 projects the given patterns on the given virtual surface from the left headlight 30L and the right headlight 30R, respectively, without distortion, based on a known geometric relative relation between the positions and the irradiation directions of the left headlight 30L and the right headlight 30R, and the given virtual surface. For example, the ECU 20 stores an irradiation image in an internal memory and so on in advance. The irradiation image is for projecting the given patterns on the given virtual surface from the left headlight 30L and the right headlight 30R, respectively, without distortion.

The ECU 20 is structured so as to be able to project the given shapes on the given virtual surface in front of a vehicle from the headlamps 30 (the respective left headlight 30L and the right headlight 30R) without distortion. To be more specific, the ECU 20 is able to project the given shapes on the given virtual surface from the left headlight 30L and the right headlight 30R, respectively, without distortion, based on a given geometric relative relation between the positions and irradiation directions of the left headlight 30L and the right headlight 30R, and the given virtual surface. For example, the ECU 20 stores an irradiation image in an internal memory and so on in advance. The irradiation image is for projecting the given shapes on the given virtual surface from the left headlight 30L and the right headlight 30R, respectively, without distortion. Thus, by referring to the foregoing state of the irradiated surface in front of a vehicle, the ECU 20 is able to project the given shapes on the irradiated surface from the left headlight 30L and the right headlight 30R, respectively, without distortion in accordance with the state of the irradiated surface, on the basis of the given virtual surface.

In short, the given virtual surface is a reference plane that is used when the ECU 20 causes each of the headlights 30L, 30R to project the given shape and the given pattern.

The headlamps 30 are lighting means for irradiating an area in front of a vehicle, and includes the left headlight 30L arranged on the left side of a front part of a vehicle, and the right headlight 30R arranged on the right side of the front part of the vehicle. The left headlight 30L and the right headlight 30R may be used as a so-called high beam, or may be used as a low beam. The headlamps 30 are explained collectively as headlamps 30 unless it is necessary to distinguish the left headlight 30L and the right headlight 30R.

The headlamps 30 are lighting means capable of drawing on any given irradiated surface in front of a vehicle, and are structured so as to be able to change a light quantity per irradiation direction within an irradiation range. In short, the headlamps 30 are able to shade brightness (luminance) in each small region on the virtual surface within the irradiation range. Examples of the structure of the headlamps 30 are explained briefly.

As an example, the headlamp 30 may be structured as projector-type (mirror element projector-type) lighting means using micromirror elements. To be specific, the headlamp 30 includes a lamp as a light source, a mirror device, and a lens. In the mirror device, a large number of micromirror elements are arrayed, and the micromirror elements control reflection directions of light from the lamp. The lens forms an image of light from the mirror device. It is possible to mechanically change a tilt angle of each of the micromirrors inside the mirror device in accordance with an electrical input. Therefore, a reflection direction of light that enters each of the micromirrors is modulated (shielded, dimmed, and so on) selectively in accordance with the tilt angle of each of the micromirrors, which can be changed selectively.

In the case of this example, the headlamp 30 is provided with a driving device (not shown) that drives the micromirrors. Then, through the driving device, the ECU 20 is able to control the tilt angle of each of the micromirror elements within the mirror device. Specifically, the ECU 20 may send an image to be projected in front of a vehicle (an irradiation image) to the driving device as a control command, and the driving device may drive each of the micromirror elements so that the irradiation image is projected in front of the vehicle.

As another example, the headlamp 30 may be structured as liquid crystal projector-type lighting means. To be specific, the headlamp 30 is provided with a lamp as a light source, a liquid crystal panel, and a lens. In the liquid crystal panel, a large number of liquid crystal elements for controlling transmission of light from the lamp are arrayed. The lens forms an image of light transmitted through the liquid crystal panel. By changing voltage applied to each of the liquid crystal elements within the liquid crystal panel, it is possible to change reflection and transmission states of light entered from the light source. Thus, by changing applied voltage for each of the liquid crystal elements, it is possible to dim or shield the light from the light source.

In the case of this example, the headlamp 30 is provided with a driving device (not shown) that drives the liquid crystal panel (controls voltage applied to each of the liquid crystal elements within the liquid crystal panel). Then, the ECU 20 is able to change voltage applied to each of the liquid crystal elements within the liquid crystal panel through the driving device. To be specific, the ECU 20 may send an image projected in front of a vehicle (an irradiation image) to the driving device as a control command, and the driving device may change voltage applied to each of the liquid crystal elements so that the irradiation image is projected in front of the vehicle.

As yet another example, the headlamp 30 may be structured by LED matrix-type lighting means. To be specific, the headlamp 30 is provided with a LED array, in which a large number of LED chips are arrayed, and a large number of lenses that form an image of light from the LED array. By changing a current quantity and current supply time for each of the LED chips, it is possible to change a light quantity of each of the LED chips.

In the case of this example, the headlamp 30 is provided with a driving device (not shown) that drives the LED array. The ECU 20 is able to control each of the LED chips within the LED array through the driving device. To be specific, the ECU 20 may send an irradiation image to the driving device as a control command. The irradiation image represents a light quantity for each of the LED chips within the LED array. Then, the driving device may change a current quantity and current supply time for each of the LED chips so that a light quantity of each of the LED chips corresponds to the irradiation image.

The headlamp 30 may be any of the structures stated above. With any of the structures, it is possible to change a light quantity in each irradiation direction within an irradiation range. The structure of the headlamp 30 is not limited to the examples stated above, and any structure may be applied as long as a light quantity can be changed in each irradiation direction within an irradiation range. Thus, it is possible to project the foregoing given pattern and given shape in front of a vehicle.

The driving device in each of the examples stated above may be provided separately in each of the left headlight 30L and the right headlight 30R, or the driving device may drive both the left headlight 30L and the right headlight 30R alone.

An ignition switch (herein after, referred to as an IG switch) 40 is a switch provided so as to start (activate) a vehicle. For example, in the case of a vehicle in which an engine (an internal combustion engine) is the only drive power source, the engine is started by performing an "On" operation of the IG switch 40. In the case of an electric vehicle, a computer (ECU) that controls the entire vehicle is activated by performing an "On" operation of the IG switch 40. The IG switch 40 outputs an IG signal (an IG-ON signal/an IG-OFF signal) to the ECU 20 in accordance with the operation.

Next, a characteristic operation carried out by the vehicle headlamp device 1 according to the embodiment, in other words, an correcting operation (an optical axis correcting operation) for optical axis deviation (irradiation position deviation) of the headlamp 30 is explained.

Figure 2:
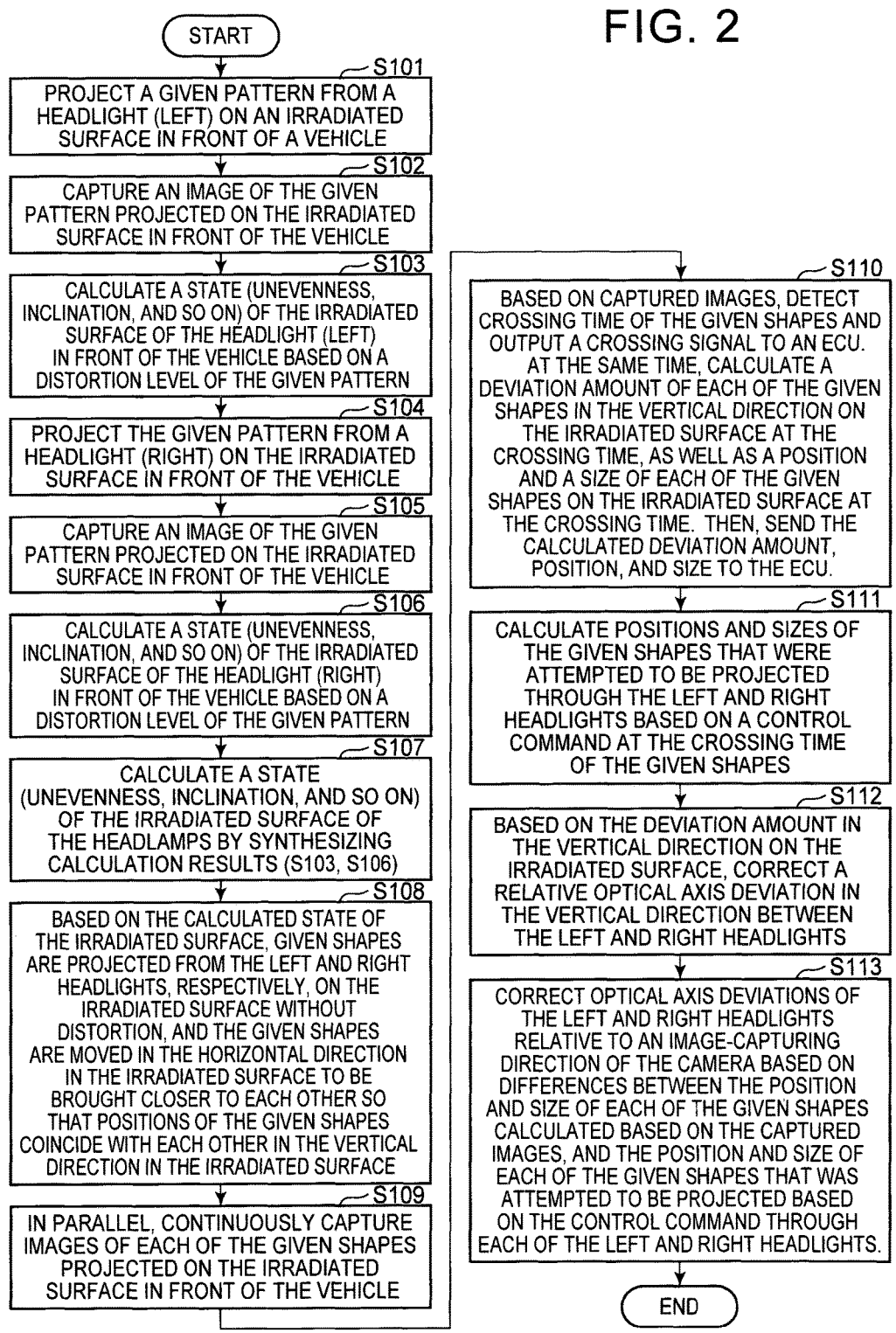
FIG. 2 is a flowchart showing an example of an operation for correcting an optical axis deviation of headlamps (optical axis correcting operation) performed by the vehicle headlamp device according to the embodiment.

FIG. 2 is a flowchart showing an example of an operation for correcting an optical axis deviation of the headlamp 30 (an optical axis correcting operation) performed by the vehicle headlamp device 1 according to this embodiment. To be specific, FIG. 2 shows an example of an operation for correcting a relative optical axis deviation between the left headlight 30L and the right headlight 30R, and optical axis deviations of the headlamps 30 relative to an image-capturing direction of the camera 10. The flowchart is executed every time the IG-ON signal is inputted to the ECU 20 from the IG switch 40 in accordance with the "On" operation of the IG switch 40. In short, the operation for correcting an optical axis deviation of the headlamp 30, which is carried out by the vehicle headlamp device 1, is performed when a vehicle is started (activated).

It is preferred that the optical axis correcting operation is carried out in a state where the periphery of a vehicle is relatively dark. Therefore, the optical axis correcting operation may be skipped when illuminance detected by an illuminance sensor (not shown) mounted on the vehicle is at a given level or higher.

First of all, in steps S101 to S107, processing of detecting (calculating) a state of the aforementioned irradiated surface (unevenness of the irradiated surface, an angle (inclination) of the irradiated surface relative to a given virtual surface, and so on) is carried out.

FIG. 3A and FIG. 3B are views explaining an example of a method for detecting a state of an irradiated surface (a road surface) by the vehicle headlamp device 1 according to this embodiment. FIG. 3A and FIG. 3B are plan views schematically showing states where the left headlight 30L and the right headlight 30R project a given pattern (a lattice pattern) on irradiated surfaces (road surfaces) in front of a vehicle, respectively. Steps S101 to S107 are explained with reference to FIG. 3A and FIG. 3B.

Irradiation ranges AL, AR of the headlights 30L, 30R in FIG. 3A and FIG. 3B are schematic and different from actual shapes of the irradiation ranges.

In step S101, the headlamp 30 projects the given pattern on the irradiated surface in front of the vehicle from the left headlight 30L. In short, the ECU 20 causes the left headlight 30L to project the given pattern on the irradiated surface in front of the vehicle. Specifically, the ECU 20 sends an irradiation image, which serves as a control command, to the foregoing driving device included in the headlamp 30. Then, in accordance with the irradiation image received by the driving device, the left headlight 30L is driven and projects the given pattern on the irradiated surface in front of the vehicle.

In an example of FIG. 3A, a lattice pattern PL having equal intervals, serving as the given pattern, is projected from the left headlight 30L on a road surface within the irradiation range AL in front of the vehicle.

In step S102, the camera 10 captures an image of the given pattern projected from the left headlight 30L on the irradiated surface in front of the vehicle.

In step S103, based on the captured image, the image-processing part 11 detects distortion of the given pattern projected from the left headlight 30L on the irradiated surface. Then, based on (the level and degree of) the distortion, a state of the irradiated surface (unevenness of the irradiated surface, an angle of the irradiated surface relative to a given virtual surface, and so on) within the irradiation range of the left headlight 30L is calculated.

In FIG. 3A, the given virtual surface serves as a plane that is the same as the plane where the vehicle is located (the road surface). Then, ideally, the plane (the given virtual surface), which is the same as the plane where the vehicle is located (the road surface), extends to an area in front of the vehicle without unevenness, and the lattice pattern PL is projected without distortion on the road surface within the irradiation range AL. However, even in the road surface that can be regarded as a plane macroscopically, when the road surface is partially uneven, straight lines structuring the lattice pattern PL are distorted in the uneven portion. In addition, when the road surface in front of the vehicle is inclined in the longitudinal direction relative to the plane where the vehicle is located (the given virtual surface), the longitudinal intervals of the straight lines, which structure the lattice pattern and extend in the horizontal direction, become unequal. Similarly, when the road surface in front of the vehicle is inclined in the horizontal direction relative to the plane where the vehicle is located (the given virtual surface), the intervals of the straight lines, which structure the lattice pattern and extend in the longitudinal direction, become unequal. This way, it is possible to detect a state of the road surface in front of the vehicle by using the fact that the lattice pattern PL is distorted in accordance with the state of the road surface including unevenness of the road surface or inclination of the road surface relative to the given virtual surface.

In step S104, the headlamp 30 projects the given pattern from the right headlight 30R on the irradiated surface in front of the vehicle. In short, the ECU 20 causes the right headlight 30R to project the given pattern on the irradiated surface in front of the vehicle. Specifically, the ECU 20 sends an irradiation image, serving as a control command, to the foregoing driving device included in the headlamp 30. Then, according to the irradiation image received by the driving device, the right headlight 30R is driven and the right headlight 30R projects the given pattern on the irradiated surface in front of the vehicle.

In the example shown in FIG. 3B, a lattice pattern PR having equal intervals is projected from the right headlight 30R as the given pattern on the road surface within an irradiation range AR in front of the vehicle.

In step S105, the camera 10 captures an image of the given pattern projected from the right headlight 30R on the irradiated surface in front of the vehicle.

In step S106, based on the captured image, the image-processing part 11 detects distortion of the given pattern projected from the right headlight 30R on the irradiated surface. Then, based on (the level and degree of) the distortion, a state of the irradiated surface (unevenness of the irradiated surface, an angle of the irradiated surface relative to a given virtual surface) within the irradiation range of the right headlight 30R is calculated.

In FIG. 3B, similarly to FIG. 3A, ideally, the plane (the given virtual surface), which is the same as the plane (the road surface) where the vehicle is located, extends to an area in front of the vehicle without unevenness, and the lattice pattern PR is projected without distortion on the road surface within the irradiation range AR. However, similarly to the description of step S103, the lattice pattern PR is distorted in accordance with the state of the road surface, which includes unevenness of the road surface and inclination of the road surface relative to the given virtual surface. Therefore, it is possible to detect a state of the road surface in front of the vehicle by using the distortion.

In step S107, the calculation results in steps S103 and S106 are synthesized, and a state of the irradiated surface of the headlamps 30 (the headlights 30L, 30R) in front of the vehicle is calculated. The state of the irradiated surface includes unevenness of the irradiated surface and an angle (inclination) of the irradiated surface relative to the given virtual surface. There is an overlap portion between the irradiation range of the left headlight 30L and the irradiation range of the right headlight 30R. For the overlap portion in the irradiated surface, the calculation results may be synthesized by, for example, averaging the calculation results of the steps S103 and S106.

From the state of the irradiated surface in front of the vehicle, which is calculated by the processing of steps S101 to S107, the specific optical axis correcting operation of the step S108 and later could not be carried out appropriately. In such a case, the processing of the step S108 and later may be skipped and the current processing may be ended. For example, in a case where another vehicle is parked in the irradiation range of the headlamp 30 (each of the headlights 30L, 30R) in front of the vehicle, the shape of the irradiated surface becomes complex. Therefore, detection of an optical axis deviation explained later can be difficult. In such a case, the current processing may be ended without carrying out a specific optical axis correcting operation.

Next, in steps S108 to S113, processing for correcting optical axis deviations (irradiation position deviations) of the headlamps 30 is carried out. FIG. 4A and FIG. 4B are views explaining an example of a method for detecting optical axis deviations (irradiation position deviations) of the headlamps 30 (the left headlight 30L and the right headlight 30R) by the vehicle headlamp device 1 according to this embodiment. Steps S108 to S113 are explained by referring to FIG. 4A and FIG. 4B as necessary.

In the explanation below, the "vertical direction in an irradiated surface" means a direction in which an irradiation position moves in response to a change of an optical axis of the headlamp 30 (each of the left headlight 30L and the right headlight 30R) in the vertical direction on the irradiated surface. For example, in a case where an irradiated surface is the same plane as a plane where a vehicle is located (a road surface), the "vertical direction in the irradiated surface" coincides with the longitudinal direction of the vehicle. In a case where an irradiated surface faces a vehicle directly and is a wall perpendicular to a plane where the vehicle is located, the "vertical direction in the irradiated surface" coincides with the vertical direction of the vehicle. In a case where an irradiated surface is inclined to a plane where a vehicle is located (a road surface), the "vertical direction in the irradiated surface" means a direction along an axis on which the axis in the longitudinal direction (the longitudinal axis) of the vehicle is projected on the irradiated surface in the vertical direction.

The "horizontal direction in an irradiated surface" means a direction in which an irradiation position moves in response to a change of an optical axis of the headlamp 30 (each of the left headlight 30L and the right headlight 30R) in the horizontal direction on the irradiated surface. For example, in a case where an irradiated surface is the same plane as a plane where a vehicle is located (a road surface), and, in a case where an irradiates surface faces a vehicle directly and is a wall perpendicular to the plane where the vehicle is located, the "horizontal direction in an irradiated surface" coincides with the horizontal direction of the vehicle. In a case where an irradiated surface is inclined to a plane where a vehicle is located (a road surface), the "horizontal direction in an irradiated surface" means a direction along an axis on which the axis in the horizontal direction (the horizontal axis) of the vehicle is projected on the irradiated surface in the vertical direction.

In step S108, based on the state of the irradiated surface calculated in step S107, the ECU 20 causes the left headlight 30L and the right headlight 30R to project given shapes, respectively, on the irradiated surface without distortion so that positions of the given shapes in the vertical direction on the irradiated surface coincide with each other. Then, the given shapes projected from the left headlight 30L and the right headlight 30R, respectively, are moved in the horizontal direction on the irradiated surface so that the given shapes are brought closer to each other. To be specific, the ECU 20 causes the left headlight 30L to project the given shape on the left side, and causes the right headlight 30R to project the given shape on the right side. Then, the given shape projected from the left headlight 30L on the irradiated surface is moved to the right on the irradiated surface, and the given shape projected from the right headlight 30R on the irradiated surface is moved to the left on the irradiated surface. In this way, the given shapes are brought closer to each other.

For example, the ECU 20 has an irradiation image in an internal memory and so on in advance. The irradiation image is used to project and move the given shape on a given virtual surface without distortion. The ECU 20 corrects the irradiation image in accordance with unevenness of the irradiated surface, an angle (inclination) of the irradiated surface relative to the given virtual surface, and so on. To be more specific, the ECU 20 may correct the irradiation image based on a correction map for correcting the irradiation image in accordance with an amount of unevenness of the irradiated surface, variation of an angle (inclination) of the irradiated surface relative to the given virtual surface, and so on. The correction map is previously stored in the internal memory and so on.

"Positions coincide with each other on an irradiated surface in the vertical direction" means that positions of the given shapes, which are projected on the irradiated surface from the headlights 30L, 30R, respectively, coincide with each other on the irradiated surface in the vertical direction, in the assumption that the headlights 30L, 30R have no optical axis deviation. To be specific, the ECU 20 matches the positions of the given shapes in the vertical direction on the irradiated surface. Here, the given shapes are attempted to be projected on the irradiated surface through the headlights 30L, 30R, respectively, based on a control command.

Movements of the given shapes stated above are achieved within the irradiation ranges, not by moving the irradiation ranges or moving the optical axis in the horizontal direction.

In step S109, in parallel with step S108, the camera 10 continuously captures images of each of the given shapes projected from the each of the headlights 30L, 30R on the irradiated surface in front of the vehicle. In short, the camera 10 continuously captures images of the irradiated surface, including each of the given shapes, in front of the vehicle, while the given shapes are projected from the headlights 30L, 30R on the irradiated surface and the given shapes move on the irradiated surface.

FIG. 4A is a view corresponding to step S108. To be specific, FIG. 4A is a view showing an example where each of the given shapes (triangles SL and SR) projected from each of the headlights 30L, 30R on the irradiated surface (the road surface) is moved.

FIG. 4A shows a case where the headlights 30L, 30R have no optical axis deviation (irradiation position deviation). In FIG. 4A, the given shapes are projected on the road surface, which serves as the irradiated surface and is the same plane as the plane where the vehicle is located (the road surface).

In the example in FIG. 4A, the triangle SL and the triangle SR are projected from the headlights 30L, 30R, respectively, at positions symmetrical to each other on the basis of a center line CL that shows a central position in the horizontal direction of the vehicle (a vehicle width direction). Then, the triangle SL and the triangle SR move at the same speed in the horizontal direction within the irradiation ranges AL, AR, respectively, from the left and right sides of the center line CL towards the center line CL.

Then, while the triangle SL and the triangle SR are projected and moved as the headlights 30L, 30R are controlled by the ECU 20, the camera 10 continuously captures images of the road surface in front of the vehicle, including the projected triangle SL and the triangle SR. The camera 10 continuously captures, for example, 30 frames of images of an area in front of the vehicle per second, in other words, in every 1/30 second.

In step S110, based on the captured images, the image-processing part 11 detects a point in time when the given shapes, which are projected from the headlights 30L, 30R on the irradiated surface, cross each other (herein after, simply referred to as "crossing time of the given shapes"), in other words, a point in time when the positions of the given shapes coincide with each other in a moving direction (the horizontal direction on the irradiated surface). Then, a signal, which indicates that the given shapes projected from the headlights 30L, 30R on the irradiated surface have crossed each other (a crossing signal), is sent to the ECU 20. At the same time, based on the captured images, the image-processing part 11 calculates a deviation amount of each of the given shapes on the irradiated surface in the vertical direction, the position of each of the given shapes (the position in the vertical direction, and the horizontal direction (the moving direction) on the irradiated surface) and the size of each of the given shapes, at crossing time of the given shapes. Then, the calculated deviation amount of each of the given shapes on the irradiated surface in the vertical direction, the position of each of the given shapes (the position in the vertical direction, and the horizontal direction (the moving direction) on the irradiated surface) and the size of each of the given shapes, at crossing time of the given shapes, are outputted to the ECU 20.

Whether or not the positions of the given shapes in the moving direction (the horizontal direction on the irradiated surface) coincide with each other may be determined based on a representative position (for example, a center, an endpoint, and so on) of each of the given shapes.

In step S111, in accordance with the crossing signal from the image-processing part 11, the ECU 20 calculates a position and a size of each of the given shapes, which was attempted to be projected based on a control command through each of the headlights 30L, 30R at crossing time of the given shapes. The "position and size of each of the given shapes that was attempted to be projected based on a control command through each of the headlights 30L, 30R" are, in other words, the position and size of each of the given shapes in a case where the headlights 30L, 30R have no optical axis deviation. The ECU 20 projects each of the given shapes from each of the headlights 30L, 30R on the irradiated surface without distortion based on the state of the irradiated surface (unevenness, an angle to the given virtual surface, and so on) calculated in step S107, which shows a relation between the given virtual surface, which serves as a reference, and an actual irradiated surface. Similarly, the ECU 20 thus calculates the position and size of each of the given shapes in the case where the headlights 30L, 30R have no optical axis deviation, based on the state of the irradiated surface (unevenness, an angle to the given virtual surface, and so on).

On receiving the crossing signal from the image-processing part 11, the ECU 20 stops moving each of the given shapes projected from each of the headlights 30L, 30R on the irradiated surface. In short, each of the given shapes projected from each of the headlights 30L, 30R on the irradiated surface is maintained in a state where the positions of the given shapes on the irradiated surface in the moving direction coincide with each other.

FIG. 4B is a view corresponding to steps S110, S111. To be specific, FIG. 4B is a view showing an example of a state where the positions of the given shapes (the triangles SL and SR), which are projected on the irradiated surface (the road surface) from the headlights 30L, 30R, respectively, coincide with each other on the irradiated surface in the moving direction (the horizontal direction), in response to FIG. 4A.

Similarly to FIG. 4A, FIG. 4B shows a state where the headlights 30L, 30R have no optical axis deviation (irradiation position deviation). In FIG. 4B, similarly to FIG. 4A, the given shapes are projected on the road surface, which serves as the irradiated surface and is the same plane as the plane where the vehicle is located (the road surface).

Referring to FIG. 4B, the triangle SL projected from the left headlight 30L moves to the right from the left side of the center line CL, and the triangle SR projected from the right headlight 30R is moved to the left from the right side of the center line CL. Thus, the triangle SL and the triangle SR overlap each other at the central position (the center line CL) of the vehicle. As stated above, in the case where the headlights 30L, 30R have no optical axis deviation, the positions of the triangles SL, SR in the vertical direction on the road surface (the irradiated surface) coincide with each other when the positions of the triangles SL, SR in the moving direction (the horizontal direction) on the road surface (irradiated surface) coincide with each other. However, when at least one of the headlights 30L, 30R has optical axis deviation in the vertical direction, and relative optical axis deviation in the vertical direction occurs, deviation in the vertical direction happens even if the positions of the triangles SL, SR coincide with each other in the moving direction. An amount of the deviation in the vertical direction corresponds to an amount of relative optical axis deviation in the vertical direction between the left headlight 30L and the right headlight 30R. Therefore, as stated earlier, in step S110, the image-processing part 11 calculates a deviation amount of each of the given shapes in the vertical direction on the irradiated surface and outputs the calculated deviation amount to the ECU 20. Thus, as in step S112 stated below, the ECU 20 is able to correct a relative optical axis deviation in the vertical direction between the left headlight 30L and the right headlight 30R based on the deviation amount.

In a case where each of the headlights 30L, 30R has an optical axis deviation relative to the image-capturing direction of the camera 10, each of the given shapes looks different from the camera 10 compared to the case where there is no optical axis deviation. In short, differences occur between the position and size of the given shape (the position and size of the given shape in the case of no optical axis deviation) that is attempted to be projected by the ECU 20 on the irradiated surface through each of the headlights 30L, 30R based on the control command, and the position and size of the given shape recognized by the image-processing part 11 based on the captured images. For example, assuming that there is no deviation in the image-capturing direction of the camera 10, in a case where the optical axis of the left headlight 30L is deviated downwardly, the position of the triangle SL projected on the road surface (irradiated surface) in FIG. 4B moves towards the vehicle (in the rear direction), and the size of the triangle SL on the road surface becomes small. On the contrary, in a case where the optical axis of the left headlight 30L is deviated upwardly, the position of the triangle SL projected on the irradiated surface (road surface) in FIG. 4B moves away from the vehicle (in the front direction), and the size of the triangle SL on the road surface becomes large. Further, in the case where the optical axis of the left headlight 30L is deviated in the left direction or the right direction, the position of the triangle SL is shifted in the left direction or the right direction more than the case where there is no optical axis deviation. Therefore, as stated earlier, in step S110, the image-processing part 11 calculates the position and size of each of the given shapes projected from each of the headlights 30L, 30R on the irradiated surface at crossing time of the given shapes, and outputs the calculated position and size to the ECU 20. Also, in step S111, as stated earlier, the ECU 20 calculates the position and size of the given shape (the position and size of the given shape in the case of no optical axis deviation) that is attempted to be projected on the irradiated surface through each of the headlights 30L, 30R based on the control command at the crossing time of each of the given shapes. Thus, as in step S113 explained below, the ECU 20 is able to correct an optical axis deviation of each of the headlights 30L, 30R relative to the image-capturing direction of the camera 10 based on difference between the position of the given shape that is actually projected, and position of the given shape projected on the irradiated surface when there is no optical axis deviation, based on difference between the size of the given shape that is actually projected, and size of the given shape projected on the irradiated surface when there is no optical axis deviation.

In step S112, the ECU 20 corrects a relative optical axis deviation between the left headlight 30L and the right headlight 30R based on the deviation amount of each of the given shapes on the irradiated surface in the vertical direction, which is received from the image-processing part 11.

For example, the ECU 20 stores a corresponding map in an internal memory or the like in advance. The corresponding map shows correspondence between a deviation amount of each of the given shapes in the vertical direction in the given virtual surface, and a deviation amount of an optical axis in the vertical direction. The ECU 20 also stores a correction map for correcting the corresponding map in accordance with an angle (inclination) of the irradiated surface relative to the given virtual surface. Then, after the corresponding map is corrected by the correction map, the ECU 20 may correct a relative optical axis deviation in the vertical direction in accordance with the corrected corresponding map. At this time, one of the headlights 30L, 30R may be determined as a correction reference in advance, and the other headlight may be corrected by a relative deviation amount in the vertical direction with respect to the headlight serving as the reference. For example, in the case where the left headlight 30L is the reference, the optical axis of the right headlight 30R is corrected by a relative deviation amount in the vertical direction.

At this time, of the given shapes projected from the headlights 30L, 30R on the irradiated surface, one of the given shapes moves relative to the other given shape, and a deviation amount in the vertical direction on the irradiated surface is canceled, resulting in a state where the given shapes overlap each other completely.

In this embodiment, by correcting an irradiation position according to a control command (an irradiation image) by an optical axis deviation amount, the ECU 20 corrects a relative optical axis deviation (an irradiation position deviation) between the left headlight 30L and the right headlight 30R. In short, by processing on software, the ECU 20 corrects an optical axis deviation by correcting an irradiation position within an irradiation range without changing the irradiation range of the headlamp 30 (each of the headlights 30L, 30R). The ECU 20 stores correction information such as a correction amount in an internal memory and so on, and controls the headlamp 30 (each of the headlights 30L, 30R) based on the correction information. For the next and succeeding correction of an optical axis deviation, the ECU 20 corrects an optical axis deviation based on the correction information.

Means for changing an irradiation range (for example, a motor that is able to tilt vertically and horizontally and drives the headlamp 30, and so on) may be applied as hardware in the headlamp 30 (each of the headlights 30L, 30R), and an optical axis deviation may be corrected by changing the irradiation range.

In step S113, the ECU 20 corrects an optical axis deviation of each of the headlights 30L, 30R relative to the image-capturing direction of the camera 10 based on difference between the position of the given shape projected on the irradiated surface, and position the given shape that was attempted to be projected on the irradiated surface through each of the headlights 30L, 30R, and based on difference between the size of the given shape projected on the irradiated surface, and size of the given shape that was attempted to be projected on the irradiated surface through each of the headlights 30L, 30R, in accordance with the control command. Then, the current processing is ended. In other words, the ECU 20 corrects an optical axis deviation of each of the headlights 30L, 30R relative to the image-capturing direction of the camera 10 based on difference between the position of the given shape projected on the irradiate surface, and position of the given shape projected on the irradiated surface when there is no optical axis deviation, based on difference between the size of the given shape projected on the irradiate surface, and size of the given shape projected on the irradiated surface when there is no optical axis deviation.

For example, the ECU 20 stores a corresponding map in an internal memory and so on in advance. The corresponding map shows correspondence between an optical axis deviation amount and variation of the position and size of the given shape in the given virtual surface. The ECU 20 also stores a correction map for correcting the corresponding map in accordance with an angle (inclination) of the irradiated surface relative to the given virtual surface, and so on. Then, after the map is corrected by the correction map, the ECU 20 corrects an optical axis deviation in the vertical and horizontal directions in accordance with the corrected corresponding map.

As described above, in step S112, the ECU 20 corrects a relative optical axis deviation in the vertical direction between the headlights 30L, 30R. Therefore, with regard to correction of an optical axis deviation in the vertical direction of the headlights 30L, 30R relative to the camera 10, correction is carried out (a correction amount is decided) for one of the headlights 30L, 30R, thereby automatically carrying out correction for the other headlight.

In this embodiment, similarly to step S112, the ECU 20 corrects the irradiation position based on a control command (an irradiation image) by an optical axis deviation amount, and thus corrects an optical axis deviation (an irradiation position deviation) of each of the headlights 30L, 30R relative to the image-capturing direction of the camera 10. In short, the ECU 20 corrects an optical axis deviation by correcting the irradiation position within the irradiation range by processing on software without changing the irradiation range of the headlamp 30 (each of the headlights 30L, 30R). The ECU 20 stores correction information such as a correction amount in an internal memory and so on, and controls the headlamp 30 (each of the headlights 30L, 30R) based on the correction information. At the same time, for next and succeeding correction the optical axis deviation, the ECU 20 corrects the optical axis deviation based on the correction information.

Similarly to step S112, means for changing the irradiation range may be applied as hardware for the headlamp 30 (each of the headlights 30L, 30R), and the optical axis deviation may be corrected by changing the irradiation range.

Next, operations and effects of the vehicle headlamp device 1 according to this embodiment are explained.

As described above, the vehicle headlamp device 1 according to this embodiment projects each of the given shapes on the irradiated surface from the left and right headlights so that the positions of the given shapes in the vertical direction on the irradiated surface coincide with each other. Then, the vehicle headlamp device 1 detects a deviation amount in the vertical direction on the irradiated surface, and corrects a relative optical axis deviation (an irradiation position deviation) in the vertical direction between the left and right headlights based on the deviation amount.

In a similar way, it is possible to correct a relative optical axis deviation in the horizontal direction between the left and right headlights. In short, each of the given shapes is projected on the irradiated surface from each of the left and right headlights so that the positions of the given shapes in the horizontal direction on the irradiated surface coincide with each other. Then, the vehicle headlamp device 1 detects a deviation amount in the horizontal direction on the irradiated surface, and corrects a relative optical axis deviation (an irradiation position deviation) in the horizontal direction between the left and right headlights based on the deviation amount.

As stated so far, the vehicle headlamp device 1 according to this embodiment is able to correct a relative optical axis deviation (in the vertical direction and horizontal direction) between the left and right headlights by itself without using dedicated equipment.

Also, by correcting a relative optical axis deviation between the left and right headlights, the vehicle headlamp device 1 is able to interlock the left and right headlights highly accurately. This is very effective in a case where, for example, a light distribution pattern is changed as necessary for the purpose of improvement of visibility of an area in front of a vehicle, and glare protection for a pedestrian, an oncoming vehicle, and so on.

In the vehicle headlamp device 1 according to this embodiment, given patterns are projected from the left and right headlights on the irradiated surface. Then, based on a captured image including the given patterns, the vehicle headlamp device 1 detects distortions of the projected given patterns, and detects (calculates) a state of the irradiated surface including unevenness, an angle (inclination) to the given virtual surface, and so on, based on the distortions. Then, the vehicle headlamp device 1 performs above-mentioned correction of a relative optical axis deviation between the left and right headlights. Thus, the given shape is projected without distortion even if the irradiated surface is uneven, or the irradiated surface is inclined relative to the given virtual surface that serves as a reference for projecting the given shape without distortion. Hence, it is possible to appropriately detect a relative optical axis deviation (a deviation amount) between the left and right headlights and correct the relative optical axis deviation between the left and right headlights more accurately.

As stated earlier, the correction is performed when the vehicle is started, and, as stated below, the optical axis correcting operation by the vehicle headlamp device 1 is to achieve performance effect for a user. Therefore, the performance effect is not prevented because the given shape is projected on the irradiated surface without distortion.

Further, the vehicle headlamp device 1 according to this embodiment moves each of the given shapes in the horizontal direction on the irradiated surface, each of the given shapes being projected on the irradiated surface from each of the left and right headlights. Thus, the positions of the given shapes in the vertical direction on the irradiated surface coincide with each other. Then, based on a deviation amount of each of the given shapes in the vertical direction at a point in time when the given shapes are moved closer to each other and crossed with each other (the positions of the given shapes in the horizontal direction in the irradiated surface coincide with each other), the vehicle headlamp device 1 corrects a relative optical axis deviation in the vertical direction between the left and right headlights. Thus, even if a relative optical axis deviation happens between the left and right headlights, and the given shapes projected on the irradiated surface are deviated in the vertical direction, it becomes unlikely that a user notices the deviation. In short, it is possible to correct a relative optical axis deviation between the left and right headlights while preventing a user from noticing a vertical deviation of each of the given shapes projected on the irradiated surface.

The given shapes are projected on the irradiated surface from the left and right headlights, moved, and then crossed with each other. A series of this flow is carried out when a vehicle is started, thereby achieving a performance effect of start (activation) of the vehicle, and correction of an optical axis deviation at the same time. For example, by using a mark of a manufacturer or a brand of the vehicle as the given shape, the mark plays a role for indicating an initial when the vehicle is started, and, by performing the series of flow of projecting, moving, and crossing the marks, it is possible to give a performance effect for a user about start of the vehicle.

In the case of correcting a relative optical axis deviation in the horizontal direction between the left and right headlights, it is preferred that each of the given shapes projected on the irradiated surface from each of the left and right headlights is moved in the vertical direction on the irradiated surface. In short, each of the given shapes projected on the irradiated surface from each of the left and right headlights is moved in the vertical direction in the irradiated surface so that the positions of the given shapes in the horizontal direction on the irradiated surface coincide with each other. Then, a relative optical axis deviation between the left and right headlights may be corrected based on a deviation amount of each of the given shapes in the horizontal direction at a point in time when the given shapes are moved closer to each other and crossed with each other (the positions of the given shapes in the vertical direction on the irradiated surface coincide with each other). In this way, the same operations and effects are achieved.

The vehicle headlamp device 1 according to this embodiment detects positions and sizes of the given shapes projected on the irradiated surface from the left and right headlights based on images captured by the camera. Then, the vehicle headlamp device 1 corrects optical axis deviations of the left and right headlights relative to the image-capturing direction of the camera based on difference between the position of the given shape projected on the irradiated surface, and position of the given shape projected on the irradiated surface from the left and right headlights when there is no optical axis deviation, and based on difference between the size of the given shape projected on the irradiated surface, size of the given shape projected on the irradiated surface from the left and right headlights when there is no optical axis deviation.

As stated so far, the vehicle headlamp device 1 is able to correct optical axis deviations of the headlamps (the left and right headlights) relative to the image-capturing direction of the camera by itself without using dedicated equipment. In particular, a deviation of the image-capturing direction of the camera is much more unlikely than a deviation of the optical axes of the headlamps (the left and right headlights). Therefore, it is practically possible to correct absolute optical axis deviations of the headlamps (the left and right headlights).

By correcting optical axis deviations of the left and right headlights relative to the camera, the vehicle headlamp device 1 is able to, for example, distribute light more appropriately in the case where a light distribution pattern is changed as appropriate based on captured images.

The vehicle headlamp device 1 according to this embodiment also detects (calculates) a state of the irradiated surface including unevenness and an angle (inclination) to the given virtual surface when the vehicle headlamp device 1 corrects optical axis deviations of the left and right headlights relative to the image-capturing direction of the camera. Then, the vehicle headlamp device 1 corrects the above-mentioned relative optical axis deviations of the left and right headlights relative to the image-capturing direction of the camera. Thus, even when the irradiated surface is uneven or the irradiated surface is inclined to the given virtual surface that serves as a reference for projecting the given shape without distortion, it is possible to project the given shape without distortion. Hence, the vehicle headlamp device 1 is able to appropriately detect relative optical axis deviations (deviation amounts) of the left and right headlights relative to the image-capturing direction of the camera, and correct the optical axis deviations of the left and right headlights to the camera with higher accuracy.

In this embodiment, after a relative optical axis deviation between the left and right headlights is corrected, relative optical axis deviations of the left and right headlights relative to the image-capturing direction of the camera is corrected. However, the latter may be carried out alone.

The foregoing optical axis correcting operation by the vehicle headlamp device 1 is carried out every time the vehicle is started (activated). Therefore, it is possible to maintain the optical axes (the irradiation positions) of the headlamps (the left and right headlights) highly accurately.

The embodiment for carrying out the invention has been explained in detail. However, the invention is not limited to the specific embodiment, and various modifications and changes may be made without departing from the gist of the invention stated in the scope of claims.

For example, in the foregoing embodiment, the given shape and the given pattern are projected (shown as shadows) within the irradiation range. However, the given shape and the given pattern may be shown on an irradiated surface in front of a vehicle by irradiating light. In this case, the vehicle headlamp device 1 also achieves operations and effects similar to those of the foregoing embodiment.

In the foregoing embodiment, the vehicle headlamp device 1 carries out the optical axis correcting operation in accordance with the "On" operation (IG-ON signal) of the IG switch 40 by a user. However, the optical axis correcting operation may be triggered by another signal corresponding to start of the vehicle. For example, in a so-called smart entry system (not shown) of the vehicle, the optical axis correcting operation may be triggered by detection of a smart key (or a user having a smart key) in a detection area outside a cabin. In short, the optical axis correcting operation may be carried out at a point in time when a user approaches the vehicle. The optical axis correcting operation may also be triggered by detection of opening of a door of a driver's seat due to a signal from a door courtesy switch (not shown) after the door is unlocked. In short, the optical axis correcting operation may be carried out at a point in time when a user (a driver) gets on the vehicle. In these cases, the vehicle headlamp device 1 is also able to achieve operations and effects similar to those of the foregoing embodiment.

In the embodiment stated above, both of the given shapes projected from the headlights 30L, 30R, respectively, on the irradiated surface are moved. However, one of the given shapes may be moved so that the given shapes are crossed each other. In short, of the given shapes projected by the headlights 30L, 30R on the irradiated surface, at least one of the given shapes needs to be moved. In this case, the vehicle headlamp device 1 also achieves operations and effects similar to those of the foregoing embodiment.

What is claimed is:

1. A vehicle headlamp device, comprising:
   headlamps, which include a left headlight and a right headlight mounted on a left side and a right side of a vehicle, respectively, and are structured so as to be able to project or irradiate given patterns and given shapes without distortion on a given virtual surface in front of the vehicle from the left headlight and the right headlight, respectively;
   a camera, disposed on the vehicle, that captures an image of an area in front of the vehicle; and
   a state detecting portion configured to detect distortion of the given patterns, which are projected or irradiated on an irradiated surface in front of the vehicle from the left headlight and the right headlight, respectively, relative to the given patterns projected or irradiated on the given virtual surface in front of the vehicle, based on the image captured by the camera, and also detect a state of the irradiated surface including unevenness of the irradiated surface and an angle of the irradiated surface to the given virtual surface based on the distortion; and
   a correcting portion configured to correct a relative optical axis deviation between the left headlight and the right headlight, wherein the headlamps project or irradiate the given shapes without distortion on the irradiated surface from the left headlight and the right headlight, respectively, based on the state detected by the state detecting portion, and the correcting portion detects a deviation amount of each of the given shapes that is projected or irradiated without distortion on the irradiated surface from each of the left headlight and the right headlight, based on the image captured by the camera, and the correcting portion corrects the optical axis deviation based on the deviation amounts of the given shapes.

2. The vehicle headlamp device according to claim 1, wherein:

the headlamps move at least one of the given shapes, which are projected or irradiated on the irradiated surface by the left headlight and the right headlight, within an irradiation range.

3. The vehicle headlamp device according to claim 2, wherein:

the headlamps cross the given shapes with each other by movement of the given shapes, the given shapes being projected or irradiated on the irradiated surface from the left headlight and the right headlight, and the correcting portion corrects the optical axis deviation based on the deviation amounts of the given shapes at the time of the crossing.

4. The vehicle headlamp device according to claim 1, wherein:

the correcting portion corrects the relative optical axis deviation in a vertical direction between the left headlight and the right headlight based on the deviation amounts of the given shapes in the vertical direction on the irradiated surface.

5. The vehicle headlamp device according to claim 4, wherein:

the correcting portion previously stores a corresponding map between a deviation amount of each of the given shapes in the vertical direction on the given virtual surface, and a deviation amount of an optical axis in the vertical direction.

6. A vehicle headlamp device, comprising:

headlamps structured so as to be able to project or irradiate a given pattern and a given shape without distortion on a given virtual surface in front of a vehicle;

a camera, disposed on the vehicle, that captures an image of an area in front of the vehicle, a state detecting portion configured to detect distortion of the given patterns, which are projected or irradiated by the headlamps on an irradiated surface in front of the vehicle, relative to the given patterns projected or irradiated on the given virtual surface in front of the vehicle, based on the image captured by the camera, and detect a state of the irradiated surface including unevenness of the irradiated surface and an angle of the irradiated surface to the given virtual surface based on the distortion; and a correcting portion configured to correct optical axis deviations of the headlamps relative to an image-capturing direction of the camera, wherein the headlamps project or irradiate the given shapes without distortion on the irradiated surface based on the state detected by the state detecting portion, and the correcting portion detects positions and sizes of the given shapes that are projected or irradiated without distortion on the irradiated surface from the headlamps, based on the image captured by the camera, and the correcting portion corrects the optical axis deviation based on difference between the position and position of the given shape, which is projected or irradiated on the irradiated surface when there is no optical axis deviation, calculated based on the state, and based on difference between the size and size of the given shape, which is projected or irradiated on the irradiated surface when there is no optical axis deviation, calculated based on the state.

7. The vehicle headlamp device according to claim 6, wherein:

the state detecting portion detects distortion of the given pattern, which is projected or irradiated on the irradiated surface in front of the vehicle from each of a left headlight and right headlight, relative to the given pattern projected or irradiated on the given virtual surface in front of the vehicle, based on the image captured by the camera, the correcting portion corrects a relative optical axis deviation between the left headlight and the right headlight, the headlamps project or irradiate the given shape without distortion on the irradiated surface from each of the left headlight and the right headlight based on the state detected by the state detecting portion, and the correcting portion detects a deviation amount of each of the given shapes in a vertical direction based on the image captured by the camera, each of the given shapes being projected or irradiated without distortion on the irradiated surface from each of the left headlight and the right headlight, and the correcting portion also corrects the relative optical axis deviation in the vertical direction between the left headlight and the right headlight based on the deviation amounts of the given shapes.

8. The vehicle headlamp device according to claim 7, wherein:

the correcting portion previously stores a corresponding map between a deviation amount of the given shape in the vertical direction on the given virtual surface, and a deviation amount of an optical axis in the vertical direction.

9. The vehicle headlamp device according to claim 7, wherein:

the correcting portion corrects optical axis deviations of the left headlight and the right headlight relative to the image-capturing direction of the camera based on difference between the position of the given shape projected on the irradiated surface, and position of the given shape projected on the irradiated surface when there is no optical axis deviation, and based on difference between the size of the given shape projected on the irradiated surface, and size of the given shape projected on the irradiated surface when there is no optical axis deviation.

10. The vehicle headlamp device according to claim 9, wherein the correcting portion previously stores a corresponding map between optical axis deviation amounts of the left headlight and the right headlight relative to the image-capturing direction of the camera, and variation of the position and the size of the given shape on the given virtual surface.

11. The vehicle headlamp device according to claim 1, wherein:

the headlamps are structured so as to be able to project or irradiate the given patterns and given shapes without distortion on the given virtual surface in front of the vehicle from the left headlight and the right headlight, respectively, based on a relation between positions and irradiation directions of the left headlight and the right headlight and the given virtual surface.

12. The vehicle headlamp device according to claim 1, wherein the irradiated surface is a road surface, and
wherein the given virtual surface includes a same plane as the road surface.

13. The vehicle headlamp device according to claim 1, wherein the irradiated surface is a road surface.

* * * * *